US008914234B2

(12) United States Patent
Roh

(10) Patent No.: US 8,914,234 B2
(45) **Date of Patent: *Dec. 16, 2014**

(54) CALIBRATING A TIGHTLY-COUPLED GNSS/MU INTEGRATION FILTER

(71) Applicant: Texas Instruments Incorporated, Dallas, TX (US)

(72) Inventor: June Chul Roh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,965

(22) Filed: May 24, 2013

(65) Prior Publication Data

US 2013/0268192 A1 Oct. 10, 2013

Related U.S. Application Data

(60) Division of application No. 12/582,846, filed on Oct. 21, 2009, now Pat. No. 8,473,207, which is a continuation-in-part of application No. 12/568,084, filed on Sep. 28, 2009, now Pat. No. 8,380,433.

(60) Provisional application No. 61/107,090, filed on Oct. 21, 2008.

(51) Int. Cl.
*G01S 1/00* (2006.01)
*G01S 19/47* (2010.01)

(52) U.S. Cl.
CPC .................................... *G01S 19/47* (2013.01)
USPC ........................................................ 701/472

(58) Field of Classification Search
USPC ......... 701/500, 505, 468–470, 472–474, 479, 701/489, 510, 511
See application file for complete search history.

(56) References Cited

U.S. PATENT DOCUMENTS

| | | | | |
|---|---|---|---|---|
| 8,374,788 | B2 * | 2/2013 | Roh | 701/472 |
| 2002/0128775 | A1 * | 9/2002 | Brodie et al. | 701/216 |
| 2003/0036847 | A1 * | 2/2003 | Geier et al. | 701/209 |

* cited by examiner

*Primary Examiner* — Kim T Nguyen
(74) *Attorney, Agent, or Firm* — Steven A. Shaw; Frederick J. Telecky, Jr.

(57) ABSTRACT

Embodiments of the invention provide methods of calibrating a blending filter based on extended Kalman filter (EKF), which optimally integrates the IMU navigation data with all other satellite measurements (tightly-coupled integration filter). In one embodiment a coordinate transformation matrix using a latest position fix is created. The state variables (for user velocity) are transformed to a local navigation coordinate. The state variables of said integration filter is estimated. A blended calibrated position fix is the output of the method.

7 Claims, 3 Drawing Sheets

CALIBRATING A TIGHTLY-COUPLED GNSS/MU INTEGRATION FILTER

CROSS-REFERENCE TO RELATED APPLICATIONS

This application is a Divisional of and claims priority to U.S. application Ser. No. 12/582,846, filed on Oct. 21, 2009—now U.S. Pat. No. 8,473,207, which is a Continuation-In-Part and claims priority under 35 U.S.C. §120 to U.S. application Ser. No. 12/568,084, filed on Sep. 28, 2009 and claims priority under 35 U.S.C. §119(e) to U.S. Provisional Application No. 61/107,090, filed on Oct. 21, 2008. This application is also related to U.S. Provisional Application No. 61/099,631, filed on Sep. 24, 2008, Non-Provisional application Ser. No. 12/565,927, filed Sep. 24, 2009, entitled DETECTING LACK OF MOVEMENT TO AID GNSS RECEIVERS. This application is related to co-pending U.S. patent application Ser. No. 12/394,404, filed on Feb. 27, 2009, entitled METHOD AND SYSTEM FOR GNSS COEXISTENCE. All of said applications incorporated herein by reference.

BACKGROUND

Embodiments of the invention are directed, in general, to navigation systems and, more specifically, to global navigation satellite system (GNSS) and inertial measurement unit (IMU) integration.

Any satellite-based navigation system suffers significant performance degradation when satellite signal is blocked, attenuated and/or reflected (multipath), for example, indoor and in urban canyons. As MEMS (micro-electro-mechanical systems) technologies advance, it becomes more interesting to integrate sensor-based inertial navigation system (INS) solutions into GNSS receivers, in pedestrian applications as well as in vehicle applications.

As GNSS receivers become more common, users continue to expect improved performance in increasingly difficult scenarios. GNSS receivers may process signals from one or more satellites from one or more different satellite systems. Currently existing satellite systems include global positioning system (GPS), and the Russian global navigation satellite system (Russian: ГЛОНАСС,, abbreviation of ГЛОбальная НАвигационная Спутниковая Система; tr.: GLObal'naya NAvigatsionnaya Sputnikovaya Sistema; "GLObal NAvigation Satellite System" (GLONASS). Systems expected to become operational in the near future include Galileo, quasi-zenith satellite system (QZSS), and the Chinese system Beidou. For many years, inertial navigation systems have been used in high-cost applications such as airplanes to aid GNSS receivers in difficult environments. One example that uses inertial sensors to allow improved carrier-phase tracking may be found in A. Soloviev, S. Gunawardena, and F. van Graas, "Deeply integrated GPS/Low-cost IMU for low CNR signal processing: concept description and in-flight demonstration," *Journal of the Institute of Navigation*, vol. 55, No. 1, Spring 2008; incorporated herein by reference. The recent trend is to try to integrate a GNSS receiver with low-cost inertial sensors to improve performance when many or all satellite signals are severely attenuated or otherwise unavailable. The high-cost and low-cost applications for these inertial sensors are very different because of the quality and kinds of sensors that are available. The problem is to find ways that inexpensive or low-cost sensors can provide useful information to the GNSS receiver.

The inertial measurement unit (IMU) may include any of the following: accelerometers, magnetometers, and/or gyroscopes. And the IMU provides independent navigation information regardless of the GNSS signal condition. In many commercial applications, low-accuracy inertial sensors are used because of cost constraint. This invention provides methods for estimating and compensating the navigation error due to using low-quality IMU, while integrating the IMU-based measurements with the GNSS-based measurements.

Sources of Dead Reckoning Errors

For pedestrian navigation, pedestrian dead reckoning (PDR) technique may be implemented because it suffices to use relatively low-accuracy sensors. The PDR is usually based on step detection, step length estimation, and heading determination. Considered are the following types of DR errors.

Speed bias/error: Any inaccuracy in step length estimation results in speed error/bias in the DR measurement.

Heading bias/error: Heading error due to soft-iron effect (local magnetic disturbance) is generally difficult to estimate and compensate since it is usually location-dependent. However, relatively large heading bias due to different attitude of IMU (from assumed one) can be estimated and compensated. For example, mounting IMU on right-side of waist will have 90 degrees of heading bias compared with the case of mounting the IMU on back waist.

Similarly, in vehicular applications, speed and heading biases are commonly observed in the INS measurement. And they are main sources of the error in the final user position and velocity estimate.

Therefore, there is a need for a tightly-coupled blending filters with calibration features built-in to track the speed and heading biases.

SUMMARY

In light of the foregoing background, embodiments of the invention provide a blending filter based on extended Kalman filter (EKF), which optimally integrates the IMU navigation data with all other satellite measurements (tightly-coupled integration filter). Two more states in the EKF for estimating/compensating the speed bias and the heading bias in the INS measurement are added.

The integration filter has no feedback loop for INS calibration, and can estimate/compensate the navigation error in the INS measurement within the integration filter.

Therefore, the system and method of embodiments of the invention solve the problems identified by prior techniques and provide additional advantages.

BRIEF DESCRIPTION OF THE DRAWINGS

Figure 1:
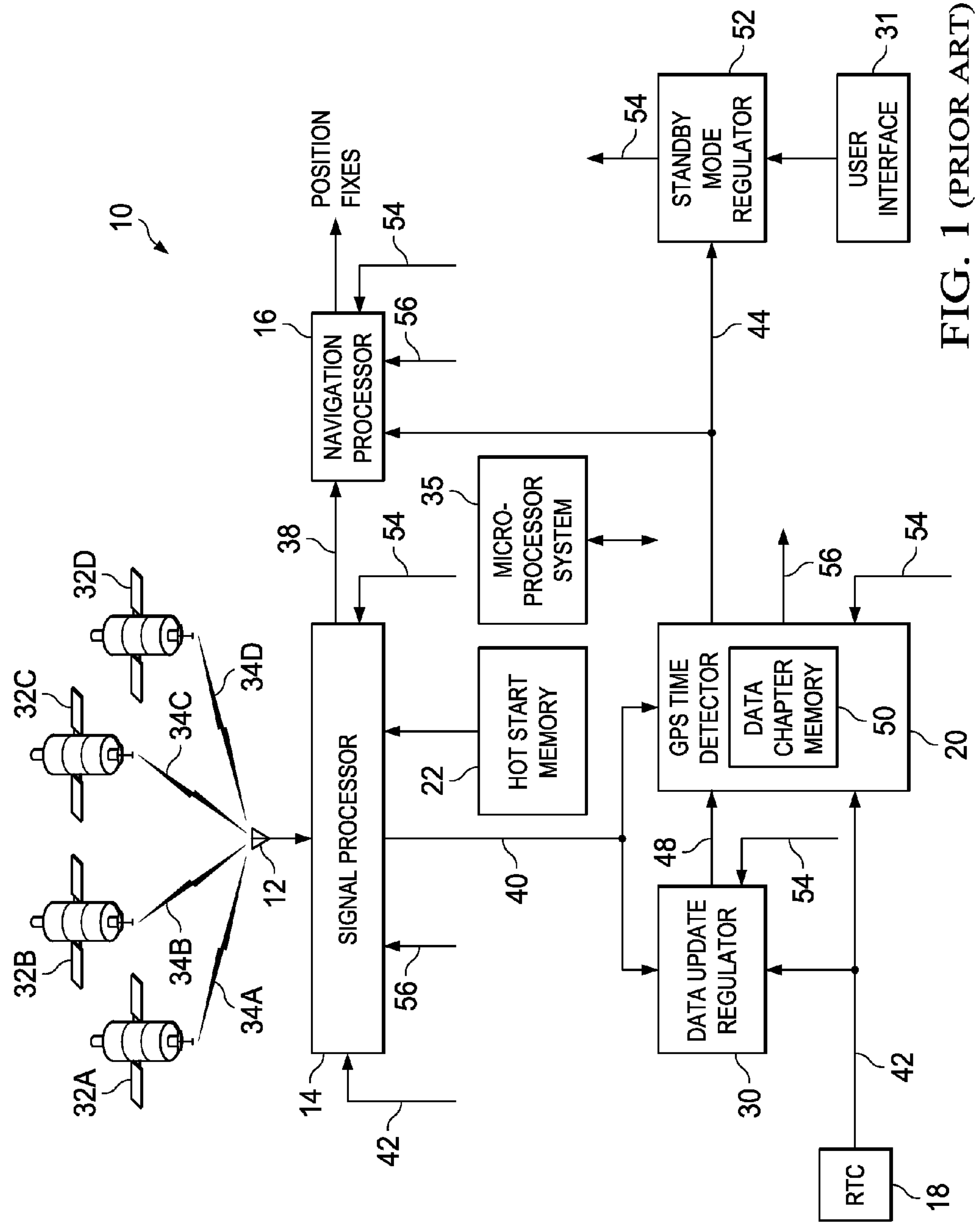

Having thus described the invention in general terms, reference will now be made to the accompanying drawings, which are not necessarily drawn to scale, and wherein:

FIG. 1 is a block diagram of a global positioning system (GPS) receiver known in the art.

Figure 2:
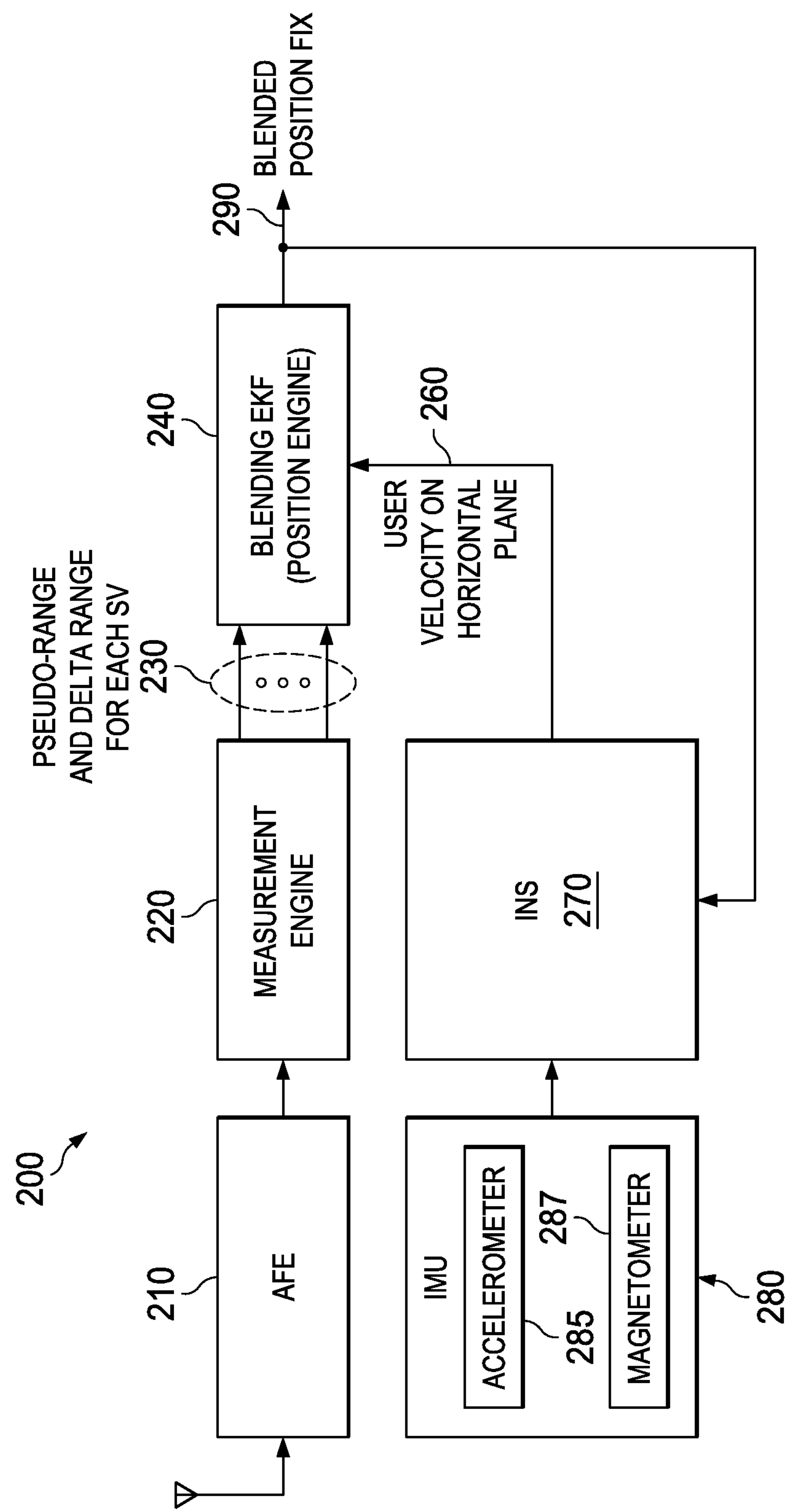

FIG. 2 shows a tightly-coupled GNSS/IMU integration (top-level) in accordance with an embodiment of the invention.

Figure 3:
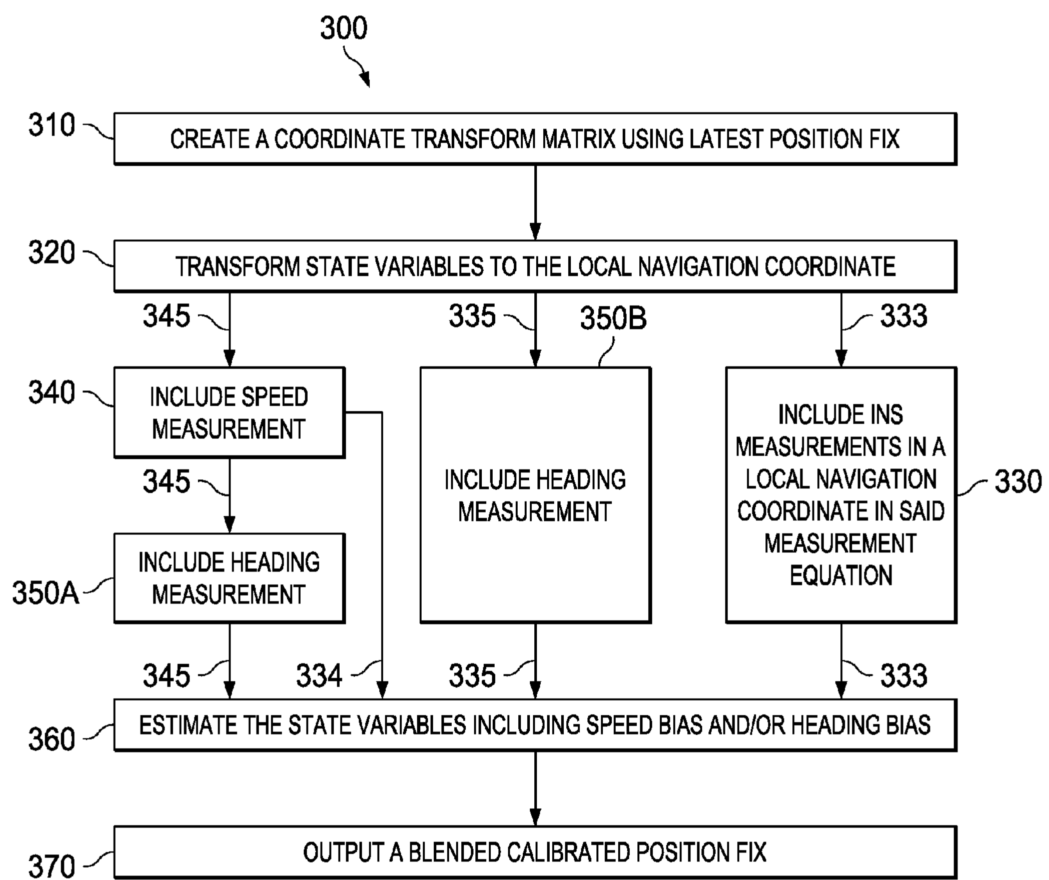

FIG. 3 is a flowchart illustrative of a methods of calibration in accordance with an embodiments of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of a global positioning system (GPS) receiver 10 known in the art. The GPS receiver 10 includes a GPS antenna 12, a signal processor 14, a navigation processor 16, a real time clock (RTC) 18, a GPS time detector 20, a hot start memory 22, a data update regulator 30 and a user interface 31. GPS signal sources 32A-D broadcast respective GPS signals 34A-D. The GPS signal sources 32A-D are normally GPS satellites. However, pseudolites may also be used. For convenience the GPS signal sources 32A-D are referred to as GPS satellites 32 and the GPS signals 34A-D are referred to as GPS signals 34 with the understanding that each of the GPS signals 34A-D is broadcast separately with separate GPS message data for each of the GPS signal sources 32A-D. A global navigation satellite system (GNSS) signal source and signal may be used in place of the GPS signal sources 32 and GPS signals 34. The receiver is described in the context of processing GPS signals, but can be used in the context of processing signals from any satellite system.

In order to more easily understand the embodiments of the invention, the structural elements of the best mode of the invention are described in terms of the functions that they perform to carry out the invention. It is to be understood that these elements are implemented as hardware components and software instructions that are read by a microprocessor in a microprocessor system 35 or by digital signal processing hardware to carry out the functions that are described.

The GPS antenna 12 converts the GPS signals 34 from an incoming airwave form to conducted form and passes the conducted GPS signals to the signal processor 14. The signal processor 14 includes a frequency down-converter; and carrier, code and data bit signal recovery circuits. The frequency down-converter converts the conducted GPS signals to a lower frequency and digitizes the lower frequency GPS signals to provide digital GPS signals. The signal recovery circuits operate on the digital GPS signals to acquire and track the carrier, code and navigation data bits for providing respective timing signals 38 and GPS data bit streams 40 for each of the GPS satellites 32. Parallel processing of the respective digital GPS signals is preferred so that the timing signals 38 and the data bit streams 40 are determined in parallel for several GPS satellites 32, typically four or more. The timing signals 38 generally include code phase, code chip timing, code cycle timing, data bit timing, and Doppler tuning.

The timing signals 38 are passed to the navigation processor 16 and the data bit streams 40 are passed to the GPS time detector 20 and the data update regulator 30. The GPS time detector 20 uses GPS clock time estimates 42 from the RTC 18 and the data bit streams 40 for determining a true GPS clock time 44 and passes the true GPS clock time 44 to the navigation processor 16. The navigation processor 16 includes a pseudorange calculator and a position detector using the timing signals 38 and the GPS clock time 44 for determining pseudoranges between the GPS antenna 12 and the GPS satellites 32 and then using the pseudoranges for determining a position fix. The navigation processor 16 passes the GPS clock time and position to the user interface 31.

The data update regulator 30 passes a specified collection 48 of data bits of the GPS data bit streams 40 to a data chapter memory 50 within the GPS time detector 20 for updating a block of GPS message data in the chapter memory 50. The user interface 31 may include keys, a digital input/output capability and a display for enabling a user to operate the GPS receiver 10 and view results of the operation of the GPS receiver 10. In general the user interface 31 is coupled through the microprocessor system 35 to each of the other elements of the GPS receiver 10.

The GPS receiver 10 also includes a standby mode regulator 52. The standby mode regulation 52 controls the GPS receiver 10 through control signals 54 to have an operation mode and a standby mode. The GPS receiver 10 may be directed to enter the standby mode at any time from the user interface 31.

In the operation mode, the GPS receiver 10 acquires the GPS signals 34 and determines a true GPS clock time 44; and uses the GPS clock time 44 for determining a two or three dimensional position fix. If time only is required, the GPS receiver 10 returns to the standby mode without determining the position fix. During the standby mode, the GPS receiver 10 reduces its power consumption and maintains standby data, including its position, in the hot start memory 22 for a state of readiness. The standby data includes the last known GPS time and position of the GPS receiver 10. Data for GPS ephemeris and almanac orbital parameters 56 is stored in the hot start memory 22 or the chapter memory 50.

When the GPS receiver 10 enters the operation mode after a time period in the standby mode, the signal processor 14 uses the GPS clock time estimates 42, the almanac or ephemeris parameters and the standby data for quickly providing the signal timing signals 38 and the data bit stream 40. The navigation processor 16 uses the GPS clock time 44, the stored ephemeris parameters, and the timing signals 38 in order to compute a first position fix for what is known as a hot start fast time to first fix (TTFF). The microprocessor system 35 is interconnected for controlling the signal processor 14, navigation processor 16, real time clock (RTC) 18, GPS time detector 20, hot start memory 22, data update regulator 30, user interface 31, data chapter memory 50 and standby mode regulator 52. The functions of the signal processor 14, navigation processor 16, real time clock (RTC) 18, GPS time detector 20, hot start memory 22, data update regulator 30, user interface 31, data chapter memory 50 and standby mode regulator 52 are implemented by the microprocessor 35 according to programmed software instructions on one or more computer readable mediums or by digital signal processing hardware or by a combination.

FIG. 2 shows a top-level block diagram for tightly-coupled GNSS/IMU integration. Analog front end (AFE) 210 converts analog data to digital data. The GNSS measurement engine 220 provides the blending EKF integration filter 240 with the following 230: pseudorange measurement, delta range measurement for each satellite. The measurement engine can also provide measurement noise variances for the pseudorange measurements and delta range measurements.

The inertial navigation system (INS) 270 or pedestrian dead reckoning (PDR) block calculates navigation information (position and/or velocity) using the inertial sensor outputs. The output of INS 270 or PDR may also be referred to as DR measurement (DR stands for dead reckoning). The proposed GNSS/IMU integration filter in accordance with embodiments of the invention uses the user velocity data given by or derived from the DR measurement (output of the INS 270 or PDR block). The INS user velocity data may be synchronized to the GNSS measurement samples. Although FIG. 2 shows the IMU 280 with accelerometers 285 and magnetometers 287, this is just an example. The IMU 280 may have other kinds of sensor combinations as well, including gyroscopes, for example. The IMU 280 and/or INS 270 may be calibrated using the blended navigation data 290.

For pedestrian navigation, PDR in the place of INS 270 may be integrated with GNSS receiver. To convert the PDR data to the velocity sampled at the GNSS sample instances, a method for PDR data conversion for ease of GNSS/PDR integration is described below. The PDR position data is converted to user velocity measured at the time instances where GNSS position/velocity estimates are available. With this method, GNSS/PDR integration can be implemented at minimum complexity. Most other solutions do not include PDR data conversion; therefore, the GNSS/PDR blending filter is complicated since it should run at step events (which is generally irregular), or step events+GNSS position updates (usually 1 Hz).

GNSS/IMU Integration Filter with Calibration Features

The GNSS/IMU integration filters in accordance with embodiments of the invention are based on extended Kalman filter (EKF). Although the EKFs discussed here have 10 states, all the GNSS/IMU integration methods that will be proposed in this invention can be also applied to

- Any other EKF structures if the state includes the user velocity, and
- EKFs in which the state is defined in a coordinate system other than ECEF (earth-centered earth-fixed). For example, the position state elements could be in latitude, longitude, and altitude.

The state of the GNSS/IMU integration EKF is defined in (1). Note that the EKF state includes two states, $b_s$ and $b_\psi$, for DR biases estimation . . .

$$x=[x,y,z,-ct_u,\dot{x},\dot{y},\dot{z},-c\dot{t}_u,b_s,b_\psi]^T. \tag{1}$$

where [x, y, z] and [$\dot{x}$, $\dot{y}$, $\dot{z}$] are 3-dimensional user position and velocity, respectively, in Earth-Centered, Earth-Fixed (ECEF) coordinate system; $t_u$ and $\dot{t}_u$ represents the clock bias and the clock drift; c is the speed of light; and $b_s$ and $b_\psi$ are the state variables for speed bias and the heading bias, respectively, both for the DR measurement. The two biases are further defined as follows:

$$b_s=s_D-s \tag{2}$$

$$b_\psi=\psi_D-\psi \tag{3}$$

where $s_D$ and $\psi_D$ are the speed and the heading from the DR measurement, respectively; and s and $\psi$ are the true speed and the true heading, respectively.

System Equation:

$$x_k = Ax_{k-1} + w_k, \tag{4}$$

$$A = \begin{bmatrix} 1 & 0 & 0 & 0 & T & 0 & 0 & 0 & 0 & 0 \\ 0 & 1 & 0 & 0 & 0 & T & 0 & 0 & 0 & 0 \\ 0 & 0 & 1 & 0 & 0 & 0 & T & 0 & 0 & 0 \\ 0 & 0 & 0 & 1 & 0 & 0 & 0 & T & 0 & 0 \\ 0 & 0 & 0 & 0 & 1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & e^{-\beta_{bs}T} & 0 \\ 0 & 0 & 0 & 0 & 0 & 0 & 0 & 0 & 0 & e^{-\beta_{b\psi}T} \end{bmatrix}$$

where T is the sample time (i.e., time difference between two successive state vectors $x_{k-1}$ and $x_k$); and $w_k$ models the process noise. Here, it is assumed that the speed bias and the heading bias are statistically-independent Gauss-Markov processes defined with parameters $\beta_{bs}$ and $\beta_{b\psi}$, respectively. It should be noted that the Gauss-Markov assumption is just an example, and other random processes may be also applied to the integration filters.

Measurement Equation:

The measurement equation for the blending filter is constructed by integrating the following three types of measurements: i) GNSS pseudorange measurement (per satellite), ii) GNSS delta range measurement (per satellite), and iii) user velocity-related measurement from sensor-based DR measurement. The GNSS portion of the measurement equation (pseudorange and delta range measurement) is the same as in the conventional stand-alone GNSS receivers. In order to integrate the DR measurements, for each option/embodiment disclosed, different measurement equation (s) are added to the GNSS-related measurement equation.

The measurement equation (generally nonlinear) for the GNSS/IMU integration filter can be expressed as follows (the time index 'k' is dropped for notational simplicity):

$$\begin{bmatrix} z^G \\ \hline z^D \end{bmatrix} = \begin{bmatrix} h^G(x) \\ \hline h^D(x) \end{bmatrix} + \begin{bmatrix} v^G \\ \hline v^D \end{bmatrix} \tag{5}$$

where $z^G$ and $z^D$ represent the GNSS measurement (pseudorange and delta range from each satellite) and the DR measurement, respectively. $h^G(x)$ is a column vector whose elements are nonlinear functions of state x, each function modeling the corresponding GNSS measurement as a function of x. Similarly, $h^D(x)$ is a stack of nonlinear functions of state x, each function modeling the corresponding DR measurement as a function of x. And $v^G$ and $v^D$ model the measurement noises for the GNSS and the DR measurement, respectively. The measurement equation (5) will be denoted in short as follows:

$$z = h(x) + v \tag{6}$$

where $$z = \begin{bmatrix} z^G \\ \hline z^D \end{bmatrix},\ h(x) = \begin{bmatrix} h^G(x) \\ \hline h^D(x) \end{bmatrix},\ v = \begin{bmatrix} v^G \\ \hline v^D \end{bmatrix}.$$

Since the measurement equations include nonlinear equations, the state can be estimated using an extended Kalman filter (EKF). In the EKF framework, a linearized measurement model is also used. Combining the GNSS-related measurement and the DR measurement, arrives at the linearlized measurement equation of form $$z=Hx+v \tag{7}$$

where the linearized measurement matrix H has two portions each for GNSS and DR, i.e., $$H = \begin{bmatrix} H^G \\ \hline H^D \end{bmatrix}.$$

GNSS Portion of Measurement Equation

As mentioned before, the GNSS portion of measurement equation is common for all the integration options which are disclosed. Therefore, the GNSS-related measurement equation is written in from (5) as follows:

$$z^G=h^G(x)+v^G \tag{8}$$

The dimension of $z^G$ changes depending on the number of satellite measurements that are combined in the blending filter. For each satellite, two measurements may contribute to the measurement equation (8): pseudorange measurement and delta range measurement. That is, the two measurements are populated in vector $z^G$ in (8), and the two corresponding elements of $h^G(x)$ model the pseudorange and the delta range as functions of the current state x with a known satellite position. Although not discussed here, other measurements are also possible, but do not change the overall measurement equation. For example, altitude constraints may be introduced as measurement equations.

In the EKF framework, the nonlinear measurement model (8) is linearized to have $$z^G = H^G x + v^G \tag{9}$$

Each row of the measurement matrix $H^G$ is determined in terms of direction cosines of the unit vector pointing from the user position to the satellite. For example, when the number of satellites is four, the measurement equation is as follows:

$$\begin{bmatrix} \rho_1 \\ \rho_2 \\ \rho_3 \\ \rho_4 \\ \dot\rho_1 \\ \dot\rho_2 \\ \dot\rho_3 \\ \dot\rho_4 \end{bmatrix} = \begin{bmatrix} a_{x1} & a_{y1} & a_{z1} & 1 & 0 & 0 & 0 & 0 & 0 & 0 \\ a_{x2} & a_{y2} & a_{z2} & 1 & 0 & 0 & 0 & 0 & 0 & 0 \\ a_{x3} & a_{y3} & a_{z3} & 1 & 0 & 0 & 0 & 0 & 0 & 0 \\ a_{x4} & a_{y4} & a_{z4} & 1 & 0 & 0 & 0 & 0 & 0 & 0 \\ 0 & 0 & 0 & 0 & a_{x1} & a_{y1} & a_{z1} & 1 & 0 & 0 \\ 0 & 0 & 0 & 0 & a_{x2} & a_{y2} & a_{z2} & 1 & 0 & 0 \\ 0 & 0 & 0 & 0 & a_{x3} & a_{y3} & a_{z3} & 1 & 0 & 0 \\ 0 & 0 & 0 & 0 & a_{x4} & a_{y4} & a_{z4} & 1 & 0 & 0 \end{bmatrix} \begin{bmatrix} x \\ y \\ z \\ -ct_u \\ \dot x \\ \dot y \\ \dot z \\ -c\dot t_u \\ b_s \\ b_\psi \end{bmatrix} + \begin{bmatrix} v_{\rho 1} \\ v_{\rho 2} \\ v_{\rho 3} \\ v_{\rho 4} \\ v_{\dot\rho 1} \\ v_{\dot\rho 2} \\ v_{\dot\rho 3} \\ v_{\dot\rho 4} \end{bmatrix} \tag{10}$$

where $\rho_i$ and $\dot\rho_i$ are the pseudorange and the delta range measurements, respectively, for the i-th satellite. $a_{xi}$, $a_{yi}$, $a_{zi}$ are the x, y, z components of the unit norm vector pointing from the user position to the i-th satellite.

In practice, there may be any number of measurements and each satellite may give only a pseudorange or only a delta range measurement. Sometimes there may not be any available measurements temporarily, in which case the predicted state is simply the propagation of the last state. In this description, it is assumed that the measurement engine always provides two measurements for each satellite, but the integration filter may discard some measurements. However, the proposed solution can apply to other systems where the measurement does not always provide measurements in this way as well.

GNSS Portion of Measurement Equation

The integration filter processes the DR measurement, i.e., the user velocity data from the INS, in the measurement equation of EKF in one of the following ways:

(Option A) Three INS measurements in local navigation coordinate (e.g., in north, east, down) may be included in the measurement equation in a way the INS measurements are a function of velocity variables of an integration filter state with a plurality of measurement noises.

(Option B) Two INS measurements in local navigation coordinate (e.g., in north, east) may be included in the measurement equation in a way the INS measurements are a function of velocity variables of an integration filter state with a plurality of measurement noises.

(Option C) Same as Option A where three INS measurements in local navigation coordinate (e.g., in north, east, down) may be included in the measurement equation in a way the INS measurements are a function of velocity variables of an integration filter state with a plurality of measurement noises, but the vertical INS measurement may be set to zero.

(Option D) The INS user velocity may be included in the measurement equation in the form of speed (magnitude of the INS velocity vector on horizontal navigation plane) and heading (angle of the INS velocity vector on horizontal navigation plane).

(Option E) Similar to option D, where the INS user velocity may be included in the measurement equation in the form of speed and heading; but only the INS user speed (magnitude of the INS velocity vector on horizontal navigation plane) included in the measurement equation.

(Option F) Similar to option D, where the INS user velocity may be included in the measurement equation in the form of speed and heading; but only the INS user heading (angle of the INS velocity vector on horizontal navigation plane) is included in the measurement equation.

In one embodiment of the invention, the INS/PDR provides 3-dimensional navigation information in local navigation frame, i.e., in NED (north, east, and down). The DR portion of the measurement equation in (5), that is, $z^D = h^D(x) + v^D$ is given as follows:

$$\dot n_D = \left(1 + \frac{b_s}{\sqrt{\dot n^2 + \dot e^2}}\right)(\dot n \cos b_\psi - \dot e \sin b_\psi) + v_{\dot n_D}, \tag{11}$$

$$\dot e_D = \left(1 + \frac{b_s}{\sqrt{\dot n^2 + \dot e^2}}\right)(\dot n \sin b_\psi + \dot e \cos b_\psi) + v_{\dot e_D}, \tag{12}$$

$$\dot d_D = \dot d + v_{\dot d_D}, \tag{13}$$

where $\dot n_D$, $\dot e_D$, and $\dot d_D$ are north, east, down component, respectively, of the user velocity that is given by or obtained from the DR measurement. And $$\begin{bmatrix} \dot n \\ \dot e \\ \dot d \end{bmatrix} = C^n_{e,3\times 3} \begin{bmatrix} \dot x \\ \dot y \\ \dot z \end{bmatrix} \tag{14}$$

where $C_{e,3\times 3}{}^n$ is a 3×3 coordinate transformation matrix (from ECEF to local navigation frame) that is given as follows:

$$C^n_{e,3\times 3} = \begin{bmatrix} -\sin(\phi)\cos(\lambda) & -\sin(\phi)\sin(\lambda) & \cos(\phi) \\ -\sin(\lambda) & \cos(\lambda) & 0 \\ -\cos(\phi)\cos(\lambda) & -\cos(\phi)\sin(\lambda) & -\sin(\phi) \end{bmatrix}. \tag{15}$$

where $\phi$ and $\lambda$ are the latitude and the longitude of the user position (this can be obtained directly from the previous position estimate). $[v_n, v_e, v_d]^T$ models the measurement noise (zero-mean Gaussian random variances with certain variances is assumed).

Since the measurement equations include nonlinear equations, the state can be estimated using an extended Kalman filter (EKF). The DR portion of the linearized measurement matrix in (7) is given as follows:

$$H^D = \begin{bmatrix} 0 & 0 & 0 & 0 & H_{1,5}^D & H_{1,6}^D & H_{1,7}^D & 0 & H_{1,9}^D & H_{1,10}^D \\ 0 & 0 & 0 & 0 & H_{2,5}^D & H_{2,6}^D & H_{2,7}^D & 0 & H_{2,9}^D & H_{2,10}^D \\ 0 & 0 & 0 & 0 & c_{3,1} & c_{3,2} & c_{3,3} & 0 & 0 & 0 \end{bmatrix} \quad (16)$$

where $c_{i,j}$ is the (i,j) component of $C_{e,3\times3}{}^n$ given in (15); and $$H_{1,5}^D = c_{1,1}\frac{\partial \dot{n}_D}{\partial \dot{n}} + c_{2,1}\frac{\partial \dot{n}_D}{\partial \dot{e}},$$

$$H_{1,6}^D = c_{1,2}\frac{\partial \dot{n}_D}{\partial \dot{n}} + c_{2,2}\frac{\partial \dot{n}_D}{\partial \dot{e}},$$

$$H_{1,7}^D = c_{1,3}\frac{\partial \dot{n}_D}{\partial \dot{n}} + c_{2,3}\frac{\partial \dot{n}_D}{\partial \dot{e}},$$

$$H_{1,9}^D = \frac{1}{\sqrt{\dot{n}^2+\dot{e}^2}}(\dot{n}\cos b_\psi - \dot{e}\sin b_\psi),$$

$$H_{1,10}^D = -\left(1+\frac{b_s}{\sqrt{\dot{n}^2+\dot{e}^2}}\right)(\dot{n}\sin b_\psi + \dot{e}\cos b_\psi),$$

$$H_{2,5}^D = c_{1,1}\frac{\partial \dot{e}_D}{\partial \dot{n}} + c_{2,1}\frac{\partial \dot{e}_D}{\partial \dot{e}},$$

$$H_{2,6}^D = c_{1,2}\frac{\partial \dot{e}_D}{\partial \dot{n}} + c_{2,2}\frac{\partial \dot{e}_D}{\partial \dot{e}},$$

$$H_{2,7}^D = c_{1,3}\frac{\partial \dot{e}_D}{\partial \dot{n}} + c_{2,3}\frac{\partial \dot{e}_D}{\partial \dot{e}},$$

$$H_{2,9}^D = \frac{1}{\sqrt{\dot{n}^2+\dot{e}^2}}(\dot{n}\sin b_\psi + \dot{e}\cos b_\psi),$$

$$H_{2,10}^D = \left(1+\frac{b_s}{\sqrt{\dot{n}^2+\dot{e}^2}}\right)(\dot{n}\cos b_\psi - \dot{e}\sin b_\psi),$$

and $$\frac{\partial \dot{n}_D}{\partial \dot{n}} = -\frac{b_s\dot{n}}{(\dot{n}^2+\dot{e}^2)^{3/2}}(\dot{n}\cos b_\psi - \dot{e}\sin b_\psi) + \left(1+\frac{b_s}{\sqrt{\dot{n}^2+\dot{e}^2}}\right)\cos b_\psi,$$

$$\frac{\partial \dot{n}_D}{\partial \dot{e}} = -\frac{b_s e}{(\dot{n}^2+\dot{e}^2)^{3/2}}(\dot{n}\cos b_\psi - e\sin b_\psi) - \left(1+\frac{b_s}{\sqrt{\dot{n}^2+\dot{e}^2}}\right)\sin b_\psi,$$

$$\frac{\partial \dot{e}_D}{\partial \dot{n}} = -\frac{b_s\dot{n}}{(\dot{n}^2+\dot{e}^2)^{3/2}}(\dot{n}\sin b_\psi + \dot{e}\cos b_\psi) + \left(1+\frac{b_s}{\sqrt{\dot{n}^2+\dot{e}^2}}\right)\sin b_\psi,$$

$$\frac{\partial \dot{e}_D}{\partial \dot{e}} = -\frac{b_s\dot{e}}{(\dot{n}^2+\dot{e}^2)^{3/2}}(\dot{n}\sin b_\psi + \dot{e}\cos b_\psi) + \left(1+\frac{b_s}{\sqrt{\dot{n}^2+\dot{e}^2}}\right)\cos b_\psi.$$

Even though not explicitly specified, all the variables ($\dot{n}$, $\dot{e}$, $b_S$, $b_\psi$) in (21) are a priori estimates, (i.e., elements of $\hat{x}_k^- = A\hat{x}_{k-1}^+$).

A second embodiment considers the cases where considers the cases where the INS/PDR provides 2-dimensional navigation information in local horizontal plane (in North and East), or only the 2-dimensional information is reliable even though 3-dimensional navigation is provided by the INS/PDR. The DR portion of the measurement equation in (5), that is, $z^D = h^D(x) + v^D$ is given as follows:

$$\dot{n}_D = \left(1+\frac{b_s}{\sqrt{\dot{n}^2+\dot{e}^2}}\right)(\dot{n}\cos b_\psi - \dot{e}\sin b_\psi) + v_{\dot{n}_D}, \quad (17)$$

-continued $$\dot{e}_D = \left(1+\frac{b_s}{\sqrt{\dot{n}^2+\dot{e}^2}}\right)(\dot{n}\sin b_\psi + \dot{e}\cos b_\psi) + v_{\dot{e}_D}, \quad (18)$$

where $\dot{n}_D$ and $\dot{e}_D$ are north and east component, respectively, of the user velocity that is given by or obtained from the DR measurement. And $$\begin{bmatrix} \dot{n} \\ \dot{e} \end{bmatrix} = C_{e,2\times3}^n \begin{bmatrix} \dot{x} \\ \dot{y} \\ \dot{z} \end{bmatrix} \quad (19)$$

where $C_{e,2\times3}{}^n$ is a 2×3 coordinate transformation matrix (from ECEF to local navigation frame) that is given as follows:

$$C_{e,2\times3}^n = \begin{bmatrix} -\sin(\phi)\cos(\lambda) & -\sin(\phi)\sin(\lambda) & \cos(\phi) \\ -\sin(\lambda) & \cos(\lambda) & 0 \end{bmatrix}. \quad (20)$$

where $\phi$ and $\lambda$ are the latitude and the longitude of the user position (this can be obtained directly from the previous position estimate). $[v_n, v_e]^T$ models the measurement noise.

Since the measurement equations include nonlinear equations, the state can be estimated using an extended Kalman filter (EKF). The DR portion of the linearized measurement matrix in (7) is given as follows:

$$H^D = \begin{bmatrix} 0 & 0 & 0 & 0 & H_{1,5}^D & H_{1,6}^D & H_{1,7}^D & 0 & H_{1,9}^D & H_{1,10}^D \\ 0 & 0 & 0 & 0 & H_{2,5}^D & H_{2,6}^D & H_{2,7}^D & 0 & H_{2,9}^D & H_{2,10}^D \end{bmatrix} \quad (21)$$

where all the elements of $H^D$ ($H_{i,j}{}^D$: i=1, 2; j=5, 6, 7, 9, 10) are the same as those given in (16).

Another embodiment is the same as the second embodiment above except with one more constraint that the vertical component of the user velocity is zero.

An additional embodiment considers cases where the DR measurement is given in terms of speed and heading. Also, sometimes it is useful to the DR measurement into speed and heading. In this case, The DR portion of the measurement equation in (5), that is, $z^D = h^D(x) + v^D$ is given as follows:

$$s_D = \sqrt{\dot{n}^2+\dot{e}^2} + b_s + v_{s_D}, \quad (22)$$

$$\psi_D = \operatorname{atan2}\left(\frac{\dot{e}}{\dot{n}}\right) + b_\psi + v_{\psi_D}, \quad (23)$$

where $s_D$ and $\psi_D$ are the speed and the heading measurement from INS/PDR, respectively; $v_{s_D}$ and $v_{\psi_D}$ model the measurement noise. And $$\begin{bmatrix} \dot{n} \\ \dot{e} \end{bmatrix} = C_{e,2\times3}^n \begin{bmatrix} \dot{x} \\ \dot{y} \\ \dot{z} \end{bmatrix} \quad (24)$$

where $C_{e,2\times3}{}^n$ is given in (20).

Since the measurement equations include nonlinear equations, the state can be estimated using an extended Kalman filter (EKF). The DR portion of the linearized measurement matrix in (7) is given as follows:

$$H^D = \begin{bmatrix} 0 & 0 & 0 & 0 & H_{1,5}^D & H_{1,6}^D & H_{1,7}^D & 0 & 1 & 0 \\ 0 & 0 & 0 & 0 & H_{2,5}^D & H_{2,6}^D & H_{2,7}^D & 0 & 0 & 1 \end{bmatrix} \quad (25)$$

where $$H_{1,5}^D = c_{1,1}\frac{\dot{n}}{\sqrt{\dot{n}^2+\dot{e}^2}} + c_{2,1}\frac{\dot{e}}{\sqrt{\dot{n}^2+\dot{e}^2}},$$

$$H_{1,6}^D = c_{1,2}\frac{\dot{n}}{\sqrt{\dot{n}^2+\dot{e}^2}} + c_{2,2}\frac{\dot{e}}{\sqrt{\dot{n}^2+\dot{e}^2}},$$

$$H_{1,7}^D = c_{1,3}\frac{\dot{n}}{\sqrt{\dot{n}^2+\dot{e}^2}} + c_{2,3}\frac{\dot{e}}{\sqrt{\dot{n}^2+\dot{e}^2}},$$

$$H_{2,5}^D = -c_{1,1}\frac{\dot{e}}{\dot{n}^2+\dot{e}^2} + c_{2,1}\frac{\dot{n}}{\dot{n}^2+\dot{e}^2},$$

$$H_{2,6}^D = -c_{1,2}\frac{\dot{e}_u}{\dot{n}^2+\dot{e}^2} + c_{2,2}\frac{\dot{n}}{\dot{n}^2+\dot{e}^2},$$

$$H_{2,7}^D = -c_{1,3}\frac{\dot{e}}{\dot{n}^2+\dot{e}^2} + c_{2,3}\frac{\dot{n}}{\dot{n}^2+\dot{e}^2},$$

Even though not explicitly specified, all the variables ($\dot{n}$, $\dot{e}$, $b_S$, $b_\psi$) in (25) are a priori estimates, (i.e., elements of $\hat{x}_k^- = A\hat{x}_{k-1}^+$). Then, the standard extended Kalman filtering equations summarized in (29) are followed.

This embodiment (speed and heading as DR measurements) allows us to characterize the speed and heading separately. In some sensor configurations, it could have more sense to use different quality metrics for speed and heading measurements. For example, in accelerometer+e-compass configuration, the speed estimation (using accelerometer) could be more reliable than the heading estimate from e-compass (since e-compass heading suffers from local magnetic disturbance).

If the DR measurement (speed and heading as DR measurements) has "down" (or vertical) component of user velocity. This embodiment can be extended by adding one more measurement equation:

$$\dot{d}_D = \dot{d} + v_{\dot{d}_D} \quad (26)$$

Corresponding EKF equation is easily obtained as in Option A.

An additional embodiment, only the speed measurement given in (22) is added to the DR portion of the measurement equation (5). And the corresponding linearized measurement matrix consists of the first row of matrix given in (25). This option works also for accelerometer-only configuration. For this embodiment, the integration EKF can have only 9 states:

$$x = [x, y, z, -ct_u, \dot{x}, \dot{y}, \dot{z}, -c\dot{t}_u, b_s]^T. \quad (27)$$

For yet an additional embodiment, only the heading measurement given in (23) is added to the DR portion of the measurement equation in (5). And the corresponding linearized measurement matrix consists of the second row of matrix given in (25). For this embodiment, the integration EKF can have only 9 states:

$$x = [x, y, z, -ct_u, \dot{x}, \dot{y}, \dot{z}, -c\dot{t}_u, b_\psi]^T. \quad (28)$$

For all the embodiments described above, the standard extended Kalman filtering equations are followed, which is summarized below:

$$\hat{x}_k^- = A\hat{x}_{k-1}^+$$

$$P_k^- = AP_{k-1}^- A^T + Q_k$$

$$K_k = P_k^- H_k^T (H_k P_k^- H_k^T + R_k)^{-1}$$

$$\hat{x}_k^+ = \hat{x}_k^- + K_k[z_k - h_k(\hat{x}_k^-)]$$

$$P_k^+ = (I - K_k H_k)P_k^- \quad (29)$$

where $Q_k$ is the covariance matrix for the process noise, i.e., $w_k$□$N(0,Q_k)$ (which means Gaussian random vector with zero-mean and covariance $Q_k$), and $R_k$ is the covariance matrix for the measurement noise, i.e., $v_k$□$N(0, R_k)$.

A method of calibration in accordance with an embodiment of the invention is shown in FIG. 3. Method 300 begins with the creation of a coordinate transformation matrix using the latest position fix (i.e. latitude and longitude) 310. At 320, state variables (for user velocity) to the local navigation coordinate is transformed using said coordinate transformation matrix. Methods in accordance with embodiments of the invention can take four paths or embodiments 345, 334, 335, and 333.

Path 345 comprises including a speed measurement in the measurement equation using a magnitude of an INS velocity 340 and including a heading measurement in the measurement equation using an angle of an INS velocity vector on horizontal navigation plane are included 350A.

Path 334 comprises including only a speed measurement in the measurement equation using a magnitude of an INS velocity 340.

Path 335 comprises including only a heading measurement in the measurement equation using an angle of an INS velocity vector on horizontal navigation plane are included 350B.

Path 333 comprises a plurality of INS measurements in a local navigation coordinate is included in said measurement equation in a way that said INS measurements are a function of velocity variables and speed and/or heading bias variables of an integration filter state with a plurality of measurement noises 330.

Paths 345, 334, 335, and 333 each also comprise 360 and 370. At 360, the state variables of said integration filter are estimated. The state variables include speed bias and/or heading bias. For example, if Kalman filter used by processing a set give in (29)

$$\hat{x}_k^- = A\hat{x}_{k-1}^+$$

$$P_k^- = AP_{k-1}^- A^T + Q_k$$

$$K_k = P_k^- H_k^T (H_k P_k^- H_k^T + R_k)^{-1}$$

$$\hat{x}_k^+ = \hat{x}_k^- + K_k[z_k - h_k(\hat{x}_k^-)]$$

$$P_k^+ = (I - K_k H_k)P_k^-;$$

A blended calibrated position fix is outputted at 370.

Option for GNSS Outage

When the GNSS measurement is unreliable (e.g., in GNSS outage, for example, indoor), tracking the DR biases is not very meaningful, since there is no reference that can be used for estimating the DR biases. In such cases, one good way is to freeze the state variables for the DR biases at GNSS outage, or more generically, when the quality of the GNSS measurement is not good. Among others, the following is a simple way to implement: To set the process noise variances for the DR bias states to small numbers. The time instance for changing the process noise variances for the DR bias states is determined based on the quality of the GNSS measurement. For example, reduce the process noise variances when GNSS position uncertainty is larger than a threshold (in GNSS outage).

Balancing Between GNSS and IMU

Blending filter is so flexible that the following options are allowed:

Selective IMU Integration: The integration filter is configured as a stand-alone GNSS position engine and does not integrate said INS measurements when GNSS measurements are reliable (when GNSS signal condition is good). For the GNSS signal condition, any metric for GNSS signal quality can be used. One example could be the number of satellites whose signal level with respect to noise level is greater than a threshold (number of available satellites). The other example is GNSS position or velocity uncertainty metric.

Continuous GNSS/IMU Integration: The measurement noise variances (per SV) for GNSS measurement are determined based on the signal quality. The measurement noise is time-varying and location-dependent. For example, it is high in bad signal condition (e.g., blockage, multipath). The measurement noise variance for INS user velocity data could be determined based on the followings: accuracy of sensors, mounting condition of IMU, and dynamics of the receiver, etc. Or, the measurement noise variance for INS user velocity may be set to be a constant (not changing over time). By these, the integration filter (EKF) balances between GNSS and IMU by itself. That is, more weight on IMU when GNSS signal is not good.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method of calibrating a hardware integration filter of a global navigation satellite system (GNSS) receiver, said method comprising:

creating a coordinate transformation matrix using a latest position fix;

transforming a plurality of state variables for an inertial navigation system (INS) user velocity to a local navigation coordinate using said coordinate transformation matrix;

including a plurality of inertial navigation system (INS) measurements in said local navigation coordinate in a measurement equation in a way that said INS measurements are a function of a plurality of velocity variables and speed bias and heading bias variables of a state of the integration filter with a plurality of measurement noises; and estimating said plurality of state variables including speed bias and heading bias of said integration filter.

2. The method of claim 1, wherein said speed bias and said heading bias are not updated when a global navigation satellite system (GNSS) measurement is unreliable.

3. The method of claim 1, further comprising setting a plurality of process noise variances for said speed bias and said heading bias to small numbers when a quality of a global navigation satellite system (GNSS) measurement is not good, so that the state variables for said speed bias and said heading bias are effectively not changing over time.

4. The method of claim 1, further comprising determining a time instance for changing a plurality of process noise variances for a plurality of dead reckoning (DR) bias states based on a quality of a global navigation satellite system (GNSS) measurement.

5. The method of claim 4, wherein said time instance for changing said plurality of process noise variances for said plurality of DR bias states is determined when a GNSS position uncertainty is larger than a threshold during a GNSS outage.

6. The method of claim 1, further comprising determining of a measurement noise variance for said plurality of measurement noises for said INS user velocity.

7. The method of claim 6, wherein determination of said measurement noise variance for said INS user velocity is selected from the group consisting of:

accuracy of sensors, mounting condition of an inertial measurement unit (IMU), and dynamics of said receiver.

* * * * *